(No Model.)
W. C. PATTERSON.
ELECTRICAL METER.
No. 333,779. Patented Jan. 5, 1886.
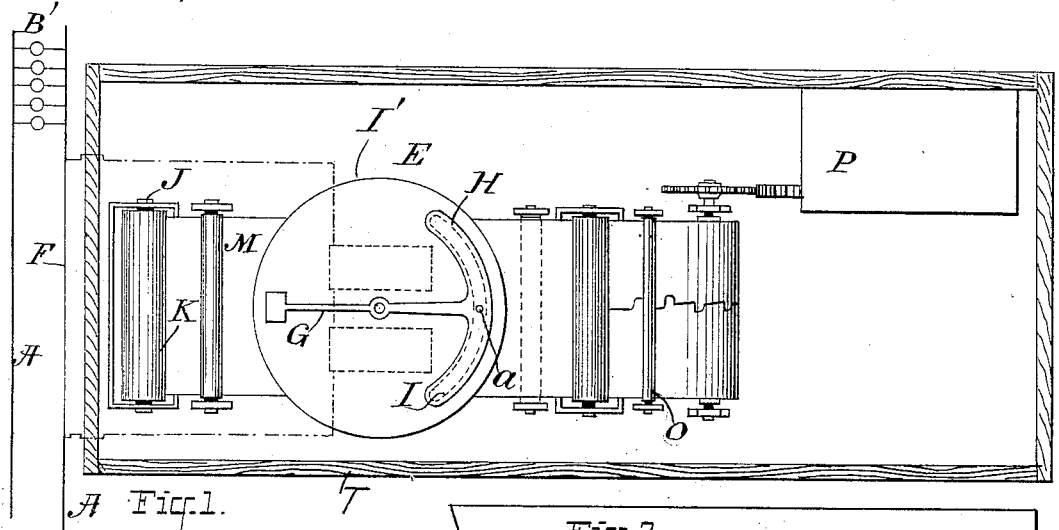
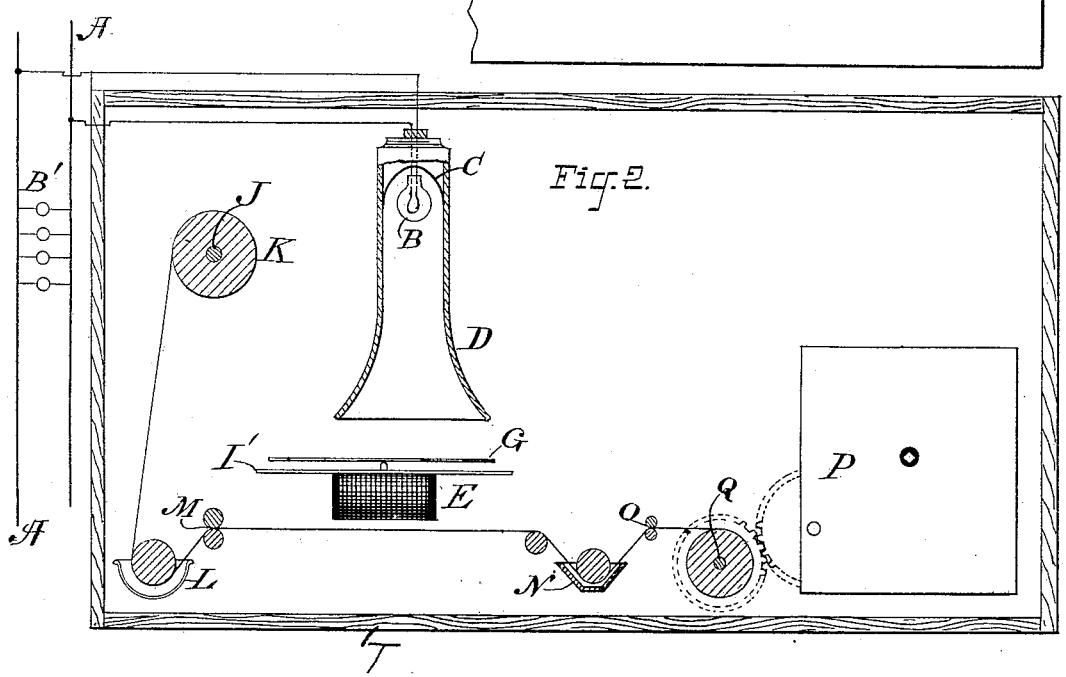
ATTEST:
J. A. Hurdle
Edward P. Thompson
INVENTOR:
William C. Patterson
by his Attorney
W. J. Johnston

UNITED STATES PATENT OFFICE.

WILLIAM CHANDLER PATTERSON, OF ELIZABETH, NEW JERSEY.

ELECTRICAL METER.

SPECIFICATION forming part of Letters Patent No. 333,779, dated January 5, 1886.

Application filed September 29, 1885. Serial No. 178,512. (No model.)

*To all whom it may concern:*

Be it known that I, WILLIAM C. PATTERSON, a citizen of the United States, and a resident of Elizabeth, in the county of Union and State of New Jersey, have invented certain new and useful Improvements in Electrical Meters, of which the following is a specification.

The valuable and patentable features of this my present invention have reference to certain important improvements in the form, combination, and disposition of the several elements embodied in the construction and necessary to the operation of the class of devices named in the title of this invention.

More particularly, my invention relates to that class of meters adapted to register the electrical energy expended by means of a mark upon a surface, such as that of a piece of paper; to that class of meters in which the needle of a galvanometer is employed as the device for determining the characteristics of the said mark, and to that class in which clock-work, operated either by mechanical or electrical energy, serves to propel the said paper.

By a general but critical examination of the state of the art, as disclosed by standard periodicals, books, and the more important patents, it is evident that there is plenty of room for improvements in the class of invention now under consideration. One device is simple, but ineffectual. Another is complicated, and therefore expensive. Another is, from the very nature of its construction, unattractive in appearance and inconvenient of operation, while others, for various objections, are practically worthless.

By a diligent and systematic and analytical study of the principles of the science of invention, by evolving improvements out of improvements, and by questioning the efficiency of each element and of all elements combined two by two, three by three, &c., I have finally succeeded in effecting such a result that the device is certainly adapted to meet the wants of all concerned in a very effectual and superior manner, which is the main object sought to be accomplished.

My idea or object fundamentally is to provide a meter for automatically registering an indication of the duration of luminosity of one or more incandescent electric lamps, so that by counting up these durations the amount of electrical energy may be calculated, it being assumed that each lamp consumes the same energy in the same time.

The invention consists, generally, of certain elements organized, essentially as described, in conformity to the accompanying drawings, adapted to operate as hereinafter explained, and for the purpose of accomplishing the above-named object, including all modifications as to their form, combination, and disposition covered by the claims hereinafter annexed, applicable to any purpose mentioned or not mentioned, but intended to be devoted to the uses herein alluded to, and different in form, combination, and disposition of parts from any device known as far as the records are able to prove.

More specifically, my invention is included in a device consisting, essentially, of the combination of a strip of paper prepared with a chemical—such as chloride, nitrate, or iodide of silver—sensitive to light, a galvanometer, arranged in a shunt to a constant resistance, a hole in the middle of said galvanometer, and a lamp, (preferably an incandescent electric lamp,) the said lamp and said hole being in a straight line, which makes an angle to the surface of said paper.

Some of the principles forming the foundation of my invention are as follows: first, paper moistened with a solution of a salt of silver—such as the chloride, iodide, or nitrate—and exposed to light becomes colored and often blackened; second, a galvanometer-needle is sensitive to a small current and points to a greater or less angle according to the current; third, when incandescent electric lamps are switched in or out of an electric current, said current receives a momentary vibration—*i. e.*, becomes suddenly stronger or weaker, respectively.

In order to illustrate the practical manner of carrying out the invention, and to enable others skilled in the art to which the invention appertains to make and use the same, drawings are hereunto annexed and described, in which similar letters represent corresponding elements, and in which each part

sensitive to light and through which bath passes said paper, a second bath through which the paper next passes, and clock-work geared to a roller upon which the paper
5 finally passes, the portion of the paper between the two baths being under said holes, substantially as and for the purpose specified.

In testimony that I claim the foregoing as my invention I have signed my name, in presence of two witnesses, this 26th day of September, 1885.

WILLIAM CHANDLER PATTERSON.

Witnesses:
CHARLES W. BARTON,
A. B. TWITCHELL.